Nov. 4, 1941. H. E. SLOAN ET AL 2,261,836
CHUCK
Filed June 15, 1939
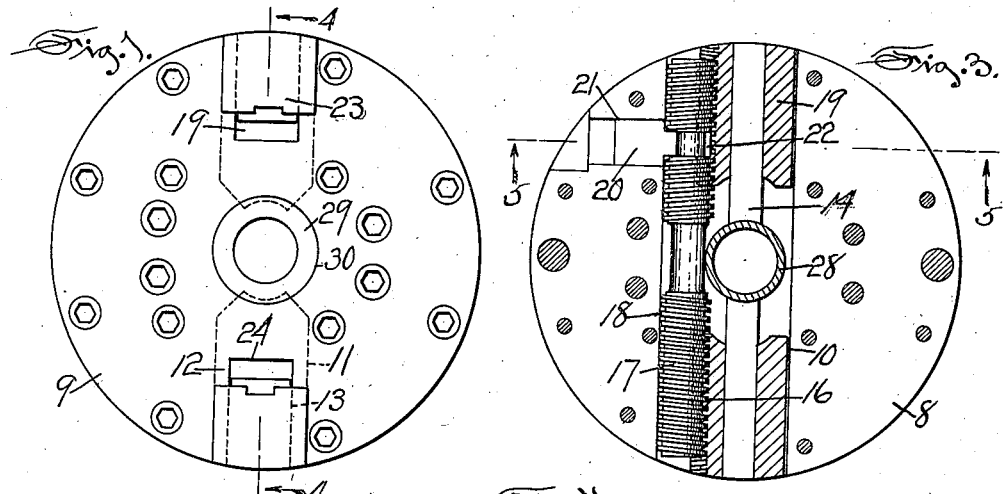
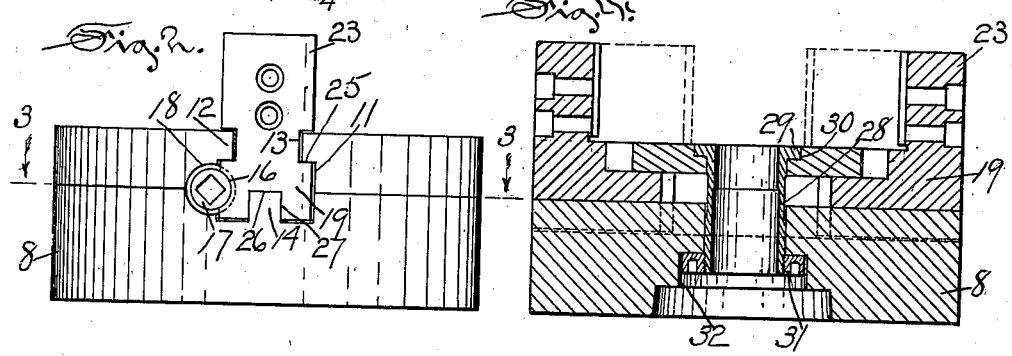
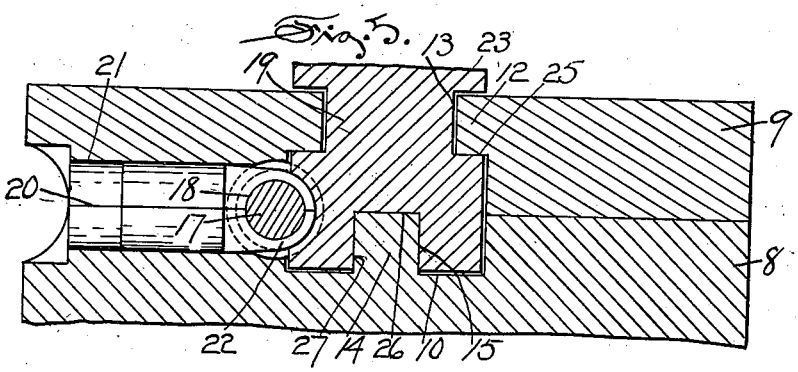
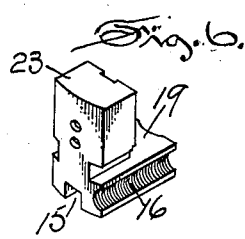 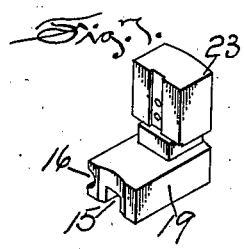
INVENTORS
Harry E. Sloan
George A. Highberg
by Arthur B. Jenkins
ATTORNEY Patented Nov. 4, 1941

2,261,836

UNITED STATES PATENT OFFICE 2,261,836

CHUCK

Harry E. Sloan, Hartford, and George A. Highberg, West Hartford, Conn., assignors to The Cushman Chuck Company, Hartford, Conn., a corporation of Connecticut Application June 15, 1939, Serial No. 279,324

4 Claims. (Cl. 279—112)

Our invention relates more especially to that class of chucks comprising chuck jaws radially movable on the face of a chuck body, and an object of our invention, among others, is the production of a chuck of this type having jaws constructed to exert a firm and rigid grip on the articles supported by the chuck for various operations on such articles; and a further object of the invention is to provide a chuck of this class that shall be extremely simple and durable in construction and operation.

One form of a chuck embodying our invention and in the construction and use of which the objects herein set out, as well as others, may be attained, is illustrated in the accompanying drawing, in which—

Figure 1 is a face view of a chuck embodying our invention.

Figure 2 is an edge view.

Figure 3 is a view in section on a plane denoted by the dotted line 3—3 of Fig. 2.

Figure 4 is a view in section on a plane denoted by the dotted line 4—4 of Fig. 1.

Figure 5 is a detail view on enlarged scale in section on a plane denoted by the dotted line 5—5 of Fig. 3.

Figure 6 is an isometric perspective view on reduced scale of one of the jaw carriers.

Figure 7 is a view similar to Fig. 6 but looking in the opposite direction.

In the use of chucks of this type, owing to features of construction, it is an extremely difficult matter to so fabricate the chuck body and the jaw carriers that the latter will have a firm bearing such that a tipping movement of the carriers and jaws secured thereto will not take place when the jaws are forced into contact with work pieces. These carriers are commonly constructed with grooves extending lengthwise along opposite sides to receive lips projecting into the chuck jaw grooves in the chuck, which lips form guides for radial movement of the jaw carriers. Efforts have been made to construct these grooves and the carriers so that they will substantially accurately fit each other. It has been practically impossible, however, to so shape the different portions of the carriers and chuck body that an accurate fit will be obtained, with a consequent effect that the jaws will have some slight movement, generally a tipping movement, which will cause them to yield when forced against a piece of work, and while this movement will be comparatively slight when measured in fractions of inches, yet, owing to the length and width of the jaws this amount of movement will be increased at the gripping point depending upon the place at which the tipping movement takes place.

In order to overcome this objection we have confined accurate formation to a minimum number of bearing parts between the carriers and the chuck body with a result that greater accuracy can be obtained in the formation of these few bearing surfaces, the liability to incorrect shape being reduced in the same ratio as the ratio of said bearing surfaces to the whole, such a chuck being shown in the accompanying drawing in which the numeral 8 denotes the back plate of a chuck body and 9 the face plate thereof. Carrier grooves 10 are formed radially in the back plate, in the structure herein shown there being two of these grooves located diametrically opposite each other. Complemental carrier grooves 11 are formed in the face plate, the two grooves 10 and 11 in each case in fact comprising a single carrier groove. Lips 12 extend from the face plate to overlie each of said grooves on each side thereof, said lips projecting into grooves 13 extending along opposite sides of each of the chuck jaw carriers, and as shown in Fig. 5 of the drawing.

A rib 14 extends along the bottom of each groove 11 and into a groove 15 formed in the bottom of each of the chuck jaw carriers 19.

Each carrier is provided with a threaded groove 16 extending along one side to receive one side of a chuck jaw feed screw 17 mounted in a recess 18 in the chuck body, said recess being of a size to take up more than one-half of the actuating screw, so that the latter is retained in said recess, as shown in Fig. 5. The threaded groove 16 is so located that it does not displace an undue amount of metal from the chuck jaw carrier and the strength of the latter is maintained for all practical purposes. The division between the back and face plates 8 and 9 is on a plane passing through the axis of the feed screw 17 lengthwise thereof and the latter is held in place against lengthwise movement by a retainer 20 located in a recess 21 in the front and back plates, as shown in Figure 5. This retainer is comprised of two pieces of substantially duplicate shape, each member comprising a strap 22 extending partially around the screw in an annular groove therein such as is common to devices of this class.

The face plate 9 has notches 24 cut into opposite edges on diametrically opposite sides thereof and a jaw supporting extension 23 from each jaw carrier 19 is located and moves radially in one of said notches, as shown in Fig. 1.

The objectionable movement of the chuck jaws hereinbefore referred to commonly occurs in a direction lengthwise of the carriers and the minimum number of bearing surfaces referred to are therefore located lengthwise of said carriers. As shown in the drawing herein bearing surfaces 25 are located between the lips 12 and the shoulders at the lower sides of the grooves 13. Opposing bearing surfaces 26 are located between the upper sides of the ribs 14 and the bottom of the groove extending lengthwise in the under side of the jaw carriers, as shown in Figs. 2 and 5 of the drawing. The bearing surfaces 25 and 26 opposing each other are readily accurately fitted to prevent any tipping movement of the carrier in a direction lengthwise and perpendicular to the plane of the bottom thereof. Bearing surfaces 27 are located between the sides of the groove in the under surface of the carriers and the rib 14, these bearing surfaces taking care of any tipping movement lengthwise of the ribs and laterally of the carriers. Except for the bearing surfaces just mentioned a slight space is left between the jaw carriers and the radial grooves at all other points, this clearance being exaggerated in the drawing herein but being sufficient to create only the bearing surfaces 25, 26 and 27 hereinabove mentioned. The back and face plates are secured together as by means of cap screws and also a sleeve 28 having a flange 29 fitting a recess 30 in the face plate 9, as shown in Figs. 1 and 4 of the drawing. The sleeve extends through the face and back plates and is secured to the latter by means of a nut 31 within a recess 32 in the back plate, said recess being formed to receive said nut and also otherwise formed to receive a support to which the chuck may be secured.

While a chuck body composed of a face and back plate constructed and arranged in a particular manner are shown and described herein, it will be understood that the invention is not to be confined to a chuck body of such construction, or in fact, to a chuck body of any particular construction, as the invention may be embodied in chucks having bodies arranged in various ways.

We claim:

1. A chuck body having radial chuck jaw grooves therein, complemental jaws members radially movable in said grooves, each of said grooves and its complemental member having a single contact bearing surface extending centrally lengthwise of said groove and member at the bottom part of said groove and at a distance from opposite sides of the jaw member for support of each jaw member perpendicularly to the plane of the bottom of the jaw member, and spaced apart contact bearing surfaces between each of said grooves and its complemental member to oppose thrust of the jaw member in opposition to that effected by said single bearing surface and on opposite sides of the latter, with a clearance between the rest of the opposing facing surfaces including opposite sides of each jaw member and body.

2. A chuck body having radial chuck jaw grooves therein, complemental chuck jaw members radially movable in each of said grooves, each of said grooves and its complemental member having contact bearing surfaces extending lengthwise of the jaw member and opposing movement of the jaw members in opposite directions perpendicular to the plane of the bottom of the jaw member, one of said bearing surfaces being located in said perpendicular planes centrally between two other contact bearing surfaces and with a clearance between the rest of the opposing facing surfaces including opposite sides of each member and body.

3. A chuck body having radial chuck jaw grooves therein, chuck jaw members radially movable in said grooves, a rib extending lengthwise along the bottom of each of said chuck jaw grooves and projecting into a groove in a chuck jaw member, there being a bearing surface on opposite sides of said rib between it and said grooves in the chuck jaw members, there being a clearance on the rest of the facing lateral surfaces appurtenant to each chuck jaw member.

4. A chuck including a body comprising a front and back plate, chuck jaw grooves extending radially therein and with notches extending inwardly from the periphery of said front plate and terminating short of the inner ends of said grooves, thereby providing tops for these ends of said chuck jaw grooves, chuck jaw members radially movable in said grooves and in said notches with their inner ends extending into the spaces underneath said tops, a sleeve having a flange located in a recess in said front plate and projecting therethrough and through the back plate, means for securing said sleeve to the back plate by clamping action against said flange to secure the front and back plates together, and means for operating said chuck jaw members.

HARRY E. SLOAN.
GEORGE A. HIGHBERG.